United States Patent Office 3,441,540
Patented Apr. 29, 1969

3,441,540
METHOD FOR THE PRODUCTION OF HIGH-MOLECULAR POLYESTERS OR CO-POLYESTERS
Klaus R. A. Müller and Georg M. Sych, Premnitz, Kreis Rathenow, and Heinz Zimmermann, Teltow-Seehof, Germany, assignors to Veb Chemiefaserwerk "Friedrich Engels," Premnitz, Kreis Rathenow, Germany
No Drawing. Filed June 28, 1965, Ser. No. 468,189
Int. Cl. C08g *17/04, 51/54, 39/00*
U.S. Cl. 260—75                                             4 Claims

ABSTRACT OF THE DISCLOSURE

An improved method for the production of high molecular resinous polyesters of thermal stability and a high degree of whiteness, wherein a glycol ester or mixture of glycol esters with a dicarboxylic aromatic or aliphatic acid is subjected to polycondensation, the improvement consisting in the use of a stabilizer-catalyst system comprising ester mixtures of phosphoric or phosphorous esters of polyhydric aliphatic alcohols in the presence of an active polycondensation catalyst consisting of an antimony or titanium oxide or salt.

---

The present invention relates to an improved process for the production of high-molecular polyesters or co-polyesters (mixed polyesters) particularly those based on polyethylene terephthalate, and which are processed preferably to threads, foils or plastic articles.

In order to obtain the necessary average degree of polycondensation of these polyesters or co-polyesters for the above purposes and to accelerate the chemical reactions necessary for the synthesis of these polymers it has been necessary to add a catalyst. Primarily metal oxides, metal salts, or mixtures thereof have been used previously as catalysts, but the addition of such a catalyst has an adverse effect on the thermal stability and/or degree of whiteness of the resulting polyesters or co-polyesters. This is particularly disadvantageous if the high molecular polycondensate must be kept in the molten state for a prolonged time during its processing, or if the end products must have a high degree of whiteness. Also, the polyesters or co-polyesters produced by this method are highly sensitive to atmospheric oxygen in the molten state and to light.

It is already known in the art that to increase the thermal stability and/or the degree of whiteness of polyesters or co-polyesters, a small amount of certain phosphorous compounds can be added during the manufacturing process, such as phosphoric acid, phosphorous acid, or the salts of these acids, also trialkyl- or triarylphosphates or -phosphites, the corresponding thiophosphoric acid compounds of tri-(hydroxyethyl)-phosphate or tri-(hydroxypropyl)-phosphate. Furthermore, it is already known in the art that to improve the thermal stability of these polycondensates such anti-oxidants may be added as alkyl gallates, N,N'-dinaphthyl-p-phenylenediamine, phenyl-beta-naphthylamine or phosphine compounds.

However, by adding the above-mentioned acids of phosphorous and by their reaction, respectively, water will also get into the polyester melt, so that there is an undesired reduction of the average degree of polycondensation. Besides, these phosphorous acids and their hydroxyalkyl compounds, respectively, enhance the undesired formation of glycol ethers, which in turn leads to a reduction of the stability to light and to a lowering of the melting point of the molded structures produced. Further, the acidity of these additives effects an excessive corrosion of the vessel material, and also due to the dissolved metal traces, particularly iron, the desired degree of whiteness of the polyesters is made partly cancelled again.

Furthermore the preparation of the above-mentioned hydroxyalkyl compounds offers considerable difficulties so that their use is economically not feasible for production purposes. No sufficient improvement of the thermal stability and/or of the degree of whiteness can be achieved with the use of salt-like compounds of phosphoric or phosphorous acid or of antioxidants during the manufacturing process in the presence of the catalyst additives which are also necessary.

Furthermore, the low-boiling trialkyl phosphites or -phosphates are not very effective, since a large amount of these highly volatile components distils off from the reaction mixture before the reaction, while the polyvalent alcohol component used in the production process, which is partly separated again in the course of the polycondensation process, is contaminated by the cleavage products of the high-boiling trialkyl- and of the triaryl phosphites or -phosphates.

The re-use of this alcohol component requires therefore an additional and careful purification. Thus, for example, when adding triphenyl phosphite or -phosphate compounds which are most frequently recommended for improving the whiteness and the thermal stability in the production of polyethylene terephthalate, the ethylene glycol obtained is contaminated with phenol. However, the purification of the ethylene glycol for re-use by distillation or other separating methods is very expensive and therefore uneconomical. Besides, the addition of the above-mentioned phosphorous compounds results in an undesired extension of the reaction time of up to 50%.

Similar adverse effects are obtained when the corresponding thiophosphoric acid compounds are added, which are in addition more toxic and have an unpleasant odor.

The object of the present invention is to eliminate the inconveniences resulting from the addition of the above-mentioned substances for improving the thermal stability or the whiteness of polyesters or co-polyesters and to obtain polyesters and co-polyesters with improved thermal stability and the degrees of whiteness. Also the present invention is concerned with improving the resistance to oxidative decomposition and to light and increasing the dye affinity of these polyesters.

This improvement is achieved, according to the present invention, by adding to the reaction mixture before or during the polycondensation process, mixtures of polymeric phosphoric- and/or phosphorous esters of polyhydric alcohols, as they can be produced most simply by reacting phosphoric and/or phosphorous acid with the respective polyhydric alcohols, and their derivatives and salts, respectively. The degree of polymerization of these phosphorous compounds plays a secondary role here, but it is of advantage for the acidity of the reaction mixture and thus for the reduction of the glycol ether formation, as well as for the corrosion of the vessel material, to use higher polycondensated phosphoric- or phosphorous esters of polyhydric alcohols.

In order to carry out the polycondensation continuously or discontinuously, it is necessary to add, as usual, a catalyst or a catalyst mixture. In selecting this polycondensation catalyst, it is necessary to select from the plurality of known compounds those whose efficiency is not or only slightly reduced by the presence of the above-mentioned phosphorous compounds. Those suitable for this purpose are primarily antimony- and titanium-compounds, like antimony-III-oxide, antimony-III-acetate, antimony glycolate, titanium ethylate and titanium glycolate.

The use of such additional polycondensation catalysts can also be dispensed with if the polymeric phosphoric- or phosphorous esters of polyhydric alcohols are used in the form of the salts of those metals whose compounds are suitable according to the foregoing considerations as condensation catalysts, such as antimony, or titanium-salts.

It is also particularly expedient to use the polymeric phosphoric- or phosphorous-esters or salts of the polyhydric alcohol, which is at the same time the alcohol component of the polyester or co-polyester. Thus, for example, it was found very expedient in the production of polyethylene terephthalate to use the polymeric phosphoric- or phosphorous-esters of ethylene glycol. For the uniform distribution of the relatively small amount of the above-mentioned additives in the reaction mixture it was found, furthermore, advantageous to effect the addition of the additive by mixing it with one of the polyhydric alcohols which are required as a component for the polyester or co-polyester to be produced.

The polymeric phosphoric- or phosphorous esters of polyhydric alcohols and their derivatives or salts respectively are added to the reaction mixture in amounts of 0.01 to 2 percent by weight, calculated on the glycol ester used as a raw material for the polycondensation.

However, it has also been found that additions of mixtures of polymeric phosphoric- or phosphorous esters of polyhydric alcohols and their derivatives or salts respectively, preferably about 10–2% by weight calculated on the glycol ester raw material, have proved particularly advantageous for improving the thermal stability and the whiteness as well as the sensitivity to oxidative influences and to light. Also, if up to 2% by weight of the above-mentioned additives are used, other properties of the polyesters or mixed polyesters, such as the degree of crystallinity and thus strength, elastic behavior, stretchability, dye affinity, dielectric properties, etc., are also modified.

The polyesters or co-polyesters produced, according to the present invention, in the manner described above show a high stability to thermal stresses, as they appear in the polycondensation process, particularly in a continuous process of polycondensation, and at processing to the end products. In this manner it is possible to stop the polycondensation at a lower average degree of polycondensation than in the polycondensates which were produced without the addition of these phosphorous compounds. Nevertheless the processed polyester or co-polyester has the same final viscosity, and a reduction in the time of the polycondensation process is achieved. The addition of mixtures of polymeric phosphoric- or phosphorous esters of polyhydric alcohols and their derivatives or salts respectively in addition to improving the above-mentioned properties of high-molecular polyesters or co-polyesters, eliminates the expensive purification of the polyhydric alcohol used in excess in the production process and separated again partly during the polycondensation process, since the polyhydric alcohols appearing as cleavage products from the phosphorous compounds used according to the invention are incorporated to a great extent in the polymer.

Due to the low acidity of the additives according to the invention the formation of glycol ether is practically avoided and corrosion of the vessel material is prevented.

Moreover, the polyesters or co-polyesters produced according to the invention show a far lower sensitivity to oxidation. While the melt, for example, of a polyethylene terephthalate produced in a known manner shows a brown discoloration after a short time in contact with atmospheric oxygen, this phenomenon is not found in a polyester produced according to the present invention.

Due to the effect on the various properties of high-molecular polyesters or co-polyesters, by the addition of phosphorous compounds, according to the invention, in quantities of up to 2% by weight, it is furthermore possible to produce modified polyesters and co-polyesters respectively which are characterized by improved dye affinity.

An important reason for not using polyester fibers based on polyethylene terephthalate in woolen system yarns and knitted goods, is the great tendency to "pilling" of the fabrics made from these fibers.

The production of a fiber which has much better properties in this respect is another reason for the use of such modified polyesters according to the present invention.

The preparation of the high molecular polyesters or co-polyesters is described by the following examples, which are given by way of illustration and not of limitation.

Example 1

In an agitator autoclave 1300 kg. terephthalic dimethyl ester are dissolved in 1000 kg. ethylene glycol at 150° C. This mixture is transesterified after addition of 410 g. manganese-II-acetate-tetrahydrate at an inside temperature of about 200° C. until at least 90% of the theoretical amount of methanol has been split off.

Then 585 g. antimony-III-oxide, 285 g. polymeric glycol phosphoric ester (prepared by heating phosphoric acid and ethylene glycol to 140 C. for 10 hours in a vacuum of about 10 mm. of mercury being refluxed with simultaneous separation of water), are added together with a suspension of 4 kg. titanium dioxide in 10 liters ethylene glycol. Excess ethylene glycol is distilled off from the transesterification product which is polycondensated for 5 hours at an inside temperature of not more than 280° C. and under a vacuum of 1.5 mm. of mercury.

This polycondensate has a value of the relative solution viscosity $\eta_{rel} = 1.40$ (measured at a concentration of 0.5% in equal parts by weight of phenol and tetrachlorethane at 20° C.). It is then remelted in an inert gas atmosphere by heating it to 278° C. with subsequent deformation to threads, foils or plastics and a degree of whiteness of 75% and a value $\eta_{rel} = 1.38$ results. Instead, structures which were produced, according to the same method from a polycondensate but without the addition of the polymeric phosphoric ester, show after their deformation a pronounced yellow discoloration. The degree of whiteness is 50% and due to thermal degradation, the $\eta_{rel} = 1.33$.

The indicated values of the degree of whiteness are obtained if purified nitrogen with 0.05% residual oxygen content is used as a protective gas in remelting. If unpurified nitrogen with about 2% residual oxygen is used as a protective gas, the degree of whiteness drops to 40% in the molded structures from polyethylene terepthalate produced without the addition of polymeric phosphoric ester, while with this addition the whiteness is not impaired under the same conditions.

Example 2

The quantities of terephthalic dimethyl ester and ethylene glycol indicated in Example 1 are transesterified in the same manner but with the addition of 650 g. calcium acetate-dihydrate instead of the manganese-II-acetate. To the transesterfied product are added 800 g. antimony-III-acetate and a suspension of 4 kg. titanium dioxide in 10 liters ethylene glycol. The excess ethylene glycol is distilled from this mixture which is polycondensated for 2 hours to an inside temperature of 260° C. under a vacuum of 1 mm. of mercury. Then 395 g. polymeric hexanediol-(1;6) phosphoric ester (prepared by heating hexanediol-(1,6) and phosphoric acid for 15 hours to 140° C. in a vacuum of 5 mm. of mercury under reflux and simultaneous separation of water) are added and the polycondensation is continued for 3 hours under a vacuum of 1 mm. of mercury to an inside temperature of 280° C.

The molded structures obtained, from this polycondensate with a $\eta_{rel} = 1.39$, have a degree of whiteness of 78% and a $\eta_{rel} = 1.38$. Molded structures produced according to the same method without the addition of the phosphorous component have only a degree of whiteness of 59% and $\eta_{rel} = 1.34$.

Example 3

940 kg. terephthalic dimethyl ester and 60 kg. sebacic dimethyl ester are transesterified with 800 kg. ethylene glycol, adding 603 g. cobalt acetate-tetrahydrate according to Example 1. To the transesterification product are added 3 kg. titanium dioxide, 615 g. antimony glycolate and 460 g. of the polymeric phosphoric ester prepared according to Example 1, dissolved in 5 kg. ethylene glycol. The polycondensation is carried out as described above.

The structures produced from this co-polyester by remelting and subsequent deformation have a degree of whiteness of 71% with a $\eta_{rel}=1.37$. However, if no phosphorus component is added, the degree of whiteness is only 52% and the $\eta_{rel}=1.33$.

Example 4

The raw material components indicated in Example 1 are transesterified and polycondensed, using instead of the addition of the stabilizer-catalyst combination of antimony-III-oxide and polymeric glycol phosphoric ester, an addition of 880 g. of the antimony salt of the last mentioned component. Instead of after 5 hours, the polycondensation is stopped after 4.5 hours with an inside temperature of 278° C.

The molded structures produced, from this polycondensate with a $\eta_{rel}=1.36$, have a degree of whiteness of 76% and the same $\eta_{rel}=1.36$.

Example 5

To the upper end of a column apparatus heated to a temperature of 190° C., are continuously added per hour, 12 kg. terephthalic dimethyl ester dissolved in 9 kg. hot ethylene glycol at 160° C., and 4.6 g. manganese-II-acetate- tetrahydrate dissolved in 500 g. ethylene glycol. To the transesterification product accumulating in the sump of the column, is added continuously a solution of 14.8 g. antimony-III-acetate and 4.6 g. polymeric glycolphosphorous ester in 500 g. ethylene glycol (prepared analogously as in Example 1 from phosphorous acid and ethylene glycol). After distilling off the excess ethylene glycol, the pre-condensate is transferred to a "extruder" type apparatus heated to 280° C. and polycondensed continuously under a vacuum of 1 mm. of mercury. The issuing melt is then molded immediately.

The molded structures have a degree of whiteness of 68% with a $\eta_{rel}=1.37$. Without the addition of the phosphorous component, only brownish products with substantially lower viscosities than indicated, were obtained.

Example 6

The production of the polymer is effected as in Example 1, but a total of 20 kg. polymeric glycol phosphoric ester are added. The modified polycondensate shows substantially different properties. Thus structures which are produced from this melt show a 31% greater dye absorption with a degree of whiteness of 61% and a $\eta_{rel}=1.32$

Example 7

In an agitator autoclave 1100 kg. ethylene glycol are heated at 160° C. then a mixture of 1235 kg. molten terephthalic dimethyl ester and 65 kg. isophthalic dimethyl ester is added. The mixture is transesterified after addition of 410 g. manganese-II-acetate-tetrahydrate at an inside temperature of about 200° C. until at least 90% of the theoretical amount of methanol have been split off.

To the transesterification product are added the stabilizer-catalyst-combination, consisting of antimony-III-oxide, polymeric glycol phosphoric ester according to Example 1, and a suspension of 4 kg. titanium dioxide in 10 liters ethylene glycol. The polycondensation is carried out as described in Example 1, but at an inside temperature of not more than 272° C. and to a $\eta_{rel}=1.38$.

The structures produced from this co-polyester by remelting and subsequent deformation have a degree of whiteness of 67% with a $\eta_{rel}=1.36$. However, if polycondensation reaction is carried out without the addition of the phosphorus component, the degree of whiteness is only 48% and the $\eta_{rel}=1.32$.

Example 8

To the upper end of a column apparatus heated to a temperature of 200° C. are continuously added per hour, a mixture of 9.6 kg. molten terephthalic dimethyl ester and 2.4 kg. isophthalic dimethyl ester, and a mixture of 7.0 g. of calcium acetate-dihydrate, 0.36 kg. titanium dioxide and 10 kg. ethylene glycol. Both mixtures have a temperature of 180° C.

To the transesterification product accumulating in the sump of the column, is added continuously a solution of 30.2 g. titanium glycolate and 5.0 g. polymeric glycolphosphoric ester in 500 g. ethylene glycol.

The continuous polycondensation is effected as described in Example 5.

The molded structures have a degree of whiteness of 57% with a $\eta_{rel}=1.32$. Without the addition of the phosphorus component, only brownish products with substantially lower viscosities than indicated, were obtained.

We claim:

1. In a method of producing high molecular weight resinous polymeric filament and film forming polyethylene terephthalate by polycondensation of bis-glycol esters of terephthalic acid, the improvement which comprises polymerizing said bis-glycol esters in the presence of catalytic amounts of a stabilizer-catalyst-system consisting of a polymeric condensation product which is a polyester of a mixture consisting of a glycol and phosphorous acid or phosphoric acid, the glycol group having from 2–10 carbon atoms, and a polycondensation catalyst which is active in the presence of said polymeric glycol phosphoric and phosphorous acid esters, said catalyst being a compound selected from the group consisting of antimony-III-oxide, antimony-III-acetate, antimony-III-glycolate, titanium-IV-ethylate and titanium-IV-glycolate.

2. The method according to claim 1, wherein the stabilizer-catalyst-system is an antimony-III salt of the polymeric condensation product.

3. The method according to claim 1, wherein from 0.01 to 2% by weight of polymeric phosphorus compound, based on the weight of the bis-glycol ester of terephthalic acid, is used.

4. The method according to claim 1, in which the glycol is ethylene glycol.

References Cited

UNITED STATES PATENTS

| | | |
|---|---|---|
| 3,028,366 | 4/1962 | Engle et al. |
| 3,070,578 | 12/1962 | Heuck et al. |
| 3,134,744 | 5/1964 | Starck et al. |
| 3,142,650 | 7/1964 | Friedman. |

FOREIGN PATENTS

| | | |
|---|---|---|
| 963,966 | 7/1964 | Great Britain. |

WILLIAM H. SHORT, *Primary Examiner.*

LOUISE P. QUAST, *Assistant Examiner.*

U.S. Cl. X.R.

260—45.7, 45.75, 429.5, 446, 860